United States Patent
Bezrukov et al.

(10) Patent No.: US 7,234,105 B2
(45) Date of Patent: Jun. 19, 2007

(54) METHODS AND SYSTEMS FOR PROVIDING A DOCUMENT WITH INTERACTIVE ELEMENTS TO RETRIEVE INFORMATION FOR PROCESSING BY BUSINESS APPLICATIONS

(75) Inventors: Vladislav Bezrukov, Leimen (DE); Thomas Göring, Wiesloch (DE); Rainer Hoch, Altlussheim (DE)

(73) Assignee: SAP AG, Walldorf (DE)

( * ) Notice: Subject to any disclaimer, the term of this patent is extended or adjusted under 35 U.S.C. 154(b) by 497 days.

(21) Appl. No.: 10/237,073

(22) Filed: Sep. 9, 2002

(65) Prior Publication Data

US 2003/0055748 A1  Mar. 20, 2003

(51) Int. Cl.
G06F 17/24  (2006.01)

(52) U.S. Cl. .................................... 715/506
(58) Field of Classification Search ................ 715/506
See application file for complete search history.

(56) References Cited

U.S. PATENT DOCUMENTS

| | | | |
|---|---|---|---|
| 5,410,648 A | 4/1995 | Pazel | |
| 5,602,997 A | 2/1997 | Carpenter et al. | |
| 5,742,836 A | 4/1998 | Turpin et al. | |
| 5,745,712 A * | 4/1998 | Turpin et al. | 715/507 |
| 5,754,174 A | 5/1998 | Carpenter et al. | |
| 5,806,079 A | 9/1998 | Rivette et al. | |
| 5,857,034 A | 1/1999 | Tsuchiya et al. | |
| 5,915,258 A | 6/1999 | Toyokura | |
| RE36,422 E | 11/1999 | Pazel | |
| 5,978,840 A * | 11/1999 | Nguyen et al. | 709/217 |
| 6,157,924 A * | 12/2000 | Austin | 715/507 |
| 6,161,113 A | 12/2000 | Mora et al. | |
| 6,192,380 B1 | 2/2001 | Light et al. | |
| 6,243,721 B1 | 6/2001 | Duane et al. | |

(Continued)

FOREIGN PATENT DOCUMENTS

DE  3602143 A1  7/1987

(Continued)

OTHER PUBLICATIONS

Jones, et al., Special Edition Using Microsoft Frontpage 2000, Chapter 3—"The Page View: Windows, Icons, and Menus" (Que Publishing, © May 17, 1999).*

(Continued)

*Primary Examiner*—Doug Hutton
(74) *Attorney, Agent, or Firm*—Finnegan, Henderson, Farabow, Garrett, & Dunner, L.L.P.

(57) ABSTRACT

A computer-implemented method for processing data used by a business application consistent with the present invention may include receiving electronic form data comprising layout data and representations of interactive elements, combining the electronic form data with customer specific data from a database to generate an intermediate form document in a data format capable of being output to a printer as a blank form without further modification, and converting the intermediate form document into a third document in a data format for display to a customer by a browser. The third document displayed to the customer looks the same as the blank form, receiving customer input data received from a customer via the third document, and associating the customer input data with the customer specific data in the business application.

6 Claims, 12 Drawing Sheets

U.S. PATENT DOCUMENTS

| | | |
|---|---|---|
| 6,345,278 B1 | 2/2002 | Hitchcock et al. |
| 6,389,434 B1 | 5/2002 | Rivette et al. |
| 6,460,042 B1 | 10/2002 | Hitchcock et al. |
| 6,484,149 B1 * | 11/2002 | Jammes et al. ............... 705/26 |
| 6,490,601 B1 | 12/2002 | Markus et al. |
| 6,499,041 B1 | 12/2002 | Breslau et al. |
| 6,519,452 B1 | 2/2003 | Agostino et al. |
| 6,519,578 B1 | 2/2003 | Reddy |
| 6,519,617 B1 * | 2/2003 | Wanderski et al. .......... 715/513 |
| 6,556,975 B1 * | 4/2003 | Wittsche ...................... 705/26 |
| 6,597,381 B1 | 7/2003 | Eskridge et al. |
| 6,664,986 B1 | 12/2003 | Kopelman et al. |
| 6,760,470 B1 | 7/2004 | Bogosian et al. |
| 6,760,490 B1 | 7/2004 | Zlotnick |
| 6,920,608 B1 | 7/2005 | Davis |
| 6,968,500 B2 * | 11/2005 | Mikhailov et al. .......... 715/505 |
| 2002/0129006 A1 | 9/2002 | Emmett et al. |
| 2005/0080756 A1 * | 4/2005 | Hitchcock et al. ............. 707/1 |

FOREIGN PATENT DOCUMENTS

| | | |
|---|---|---|
| DE | 4216893 C2 | 11/1992 |
| DE | 4308291 C2 | 9/1994 |
| DE | 4308291 C2 | 11/1994 |
| EP | 0230994 B1 | 8/1987 |
| WO | WO 98/36365 | 8/1998 |
| WO | WO 00/16307 | 3/2000 |

OTHER PUBLICATIONS

Marchal, Applied XML Solutions, Chapter 3—"Electronic Forms" (Sams Publishing, © Aug. 29, 2000).*

"SAP Smart Forms (BC-SRV-SCR)", Release 46D, SAP Online Help, 2000, 73 pages.

"SAP Smart Forms, Form Printing in the Internet Age", 1999, mysap.com, 2 pages.

* cited by examiner

TREE VIEW

PROPERTY VIEW

| GENERAL ATTRIBUTES | WEB PROPERTIES |
|---|---|

EDITOR

& book_title_1 &, check box 1

313   DOCUMENT AS MODIFIED BY CUSTOMER

T. S.

T. please see new books by M. T.

ALPHA          ☑

BETA           ☐

Credit Card 1234-5678-1234-5678    SUBMIT ◼

FIG. 10

323 RESPONSE DOCUMENT

URL, BOX 1 CHECKED, 1234-5678-1234-5678, SUBMIT

FIG. 11

METHODS AND SYSTEMS FOR PROVIDING A DOCUMENT WITH INTERACTIVE ELEMENTS TO RETRIEVE INFORMATION FOR PROCESSING BY BUSINESS APPLICATIONS

RELATED APPLICATION

This patent application is related to U.S. patent application Ser. No. 09/872,515, filed Jun. 1, 2001, entitled "Defining form formats with layout elements that present data of business application".

FIELD OF THE INVENTION

The present invention generally relates to computer technology, and, more particularly, relates to computers that provide documents with interactive elements to retrieve information for processing by business applications.

BACKGROUND OF THE INVENTION

In a traditional meaning, a "form" is a printed or typed document with blank spaces for insertion of required or requested information. A form is convenient for communication, for example, from an organization to a customer. Taking an invoice document as an illustrative example, the document is a filled-in form. The form contains a standardized portion for defining name and date fields (i.e. the "form") and a specialized portion for the particular name and particular date. With the advent of computer technology and the use of computer applications either by the organization or by the person, electronic forms have become widespread.

Organizations use business application programs to organize information flow within the organization or to communicate to and from the organization. Application programs are, for example, programs to assist customer relationship management (CRM), finance management, and human resource management. Although application programs differ from one another and are often customized to the organization, it is common for most of them that information leaving the organization in a final document is on a traditional medium, such as paper.

Often, the documents on paper are invoices, delivery notes, reminder letters, purchase orders, checks, or customs declarations. For example, an invoice has pages (e.g., sheets of paper), text areas (e.g., for printing positions to be invoiced, often in tables; greetings to the recipient), an address area (e.g., for printing recipients' address), and a graphic area (e.g., for printing a logotype of the sender).

Layout definitions comprise, for example, page breaks, line breaks, fonts indicators, position information, indent, tabulators, protection against line breaks in paragraph, and others.

Designing forms no longer require the designer to be computer-language literate. He or she benefits from builder software with a graphical interface such as, for example, the "Smart Forms" software, commercially available from SAP AG, Walldorf (Baden), Germany.

At a first time point, the designer creates a new form by a so-called "form builder", a computer program that resembles a commercially-available text and image processing program.

At a second, later time point, an output program reads data from the application program, instantiates the form, and prints the documents or generates an XML-output for displaying the document by a web browser. The output program receives the data via a predefined form-interface from the application program.

So far, using forms and documents as described above technically only allows unidirectional communication. In other words, the document (and the information embodied thereon) goes from the organization to the customer. However, communication in the opposite direction is often desired as well. There is an ongoing need to provide form-defining software that allows forms with bi-directional communication capacity.

SUMMARY OF THE INVENTION

The present invention relates to a method for retrieving information through interactive elements on a browser for subsequent processing by a business application. The method comprises storing layout data with interactive elements in a first document while designing a visual document appearance; processing the first document by adding customer specific data from the business application, thereby providing a second document in markup language, the second document having representations for the interactive elements; receiving customer input data from a customer in a third document from a browser, wherein the browser has presented the visual document appearance of the second document to the customer and has prompted the customer through the interactive elements to return customer input data; and relating customer input data with customer specific data in the business application.

In certain embodiments, storing layout data is performed on a first computer, processing is performed on a second computer, receiving customer input data is performed an a third computer that communicates with the second computer via the Internet, and relating is performed on the second computer.

The present invention also relates to an interactive computer system that feeds customer input data into a business application. The system comprises: a first computer to design a visual document appearance, to provide thereby layout data with interactive elements in a first document; a second computer to process the first document by adding customer specific data from the business application, to provide thereby a second document, to code the second document into markup language having representations for the interactive elements, and to further relate customer input data with customer specific data in the business application; and a third computer with a browser to display a visual representation of the second document to the customer as designed by the first computer to prompt the customer for input data through the interactive elements and to forward the input data to the second computer through a third document.

In certain embodiments, the first computer has a graphical interface that assists a designer by displaying a tree view to the document structure and by displaying a property view to the properties of layout items.

The present invention also relates to a method for prompting a customer to input customer input data. The method comprises, by a form builder at a design computer, designing a form document with layout data, the form document having representations of interactive elements to be shown to the customer; by a pre-processing module at an application computer, pre-processing the form document to provide an intermediate document, thereby combining layout data with customer specific data and converting the representations of interactive elements into markup code for interactive elements; by a browser at a customer computer, interpreting the markup code to present the intermediate document to the customer and to prompt the customer to input customer input data into the interactive elements, thereby providing a final document with layout data, customer specific data and customer input data; by the browser at the customer computer, providing a response document with customer input data; and by a post-processing module at the application computer, post-processing the customer input data in combination with customer specific data.

The present invention also relates to a combination of computer-program products to process customer input data obtained through browser-customer interaction by interactive elements. The combination comprises: a first product for designing a first document with layout data that partially represents the interactive elements; a second product to provide a second document by adding customer specific data to the first document and by coding the interactive elements such that a browser interpreting the second document is able to write customer input data into a third document; and a third product to process the third document in combination with customer specific data.

In certain embodiments, the first product is a form builder, the second product is a pre-processing module, and the third product is a post-processing module. In certain other embodiments, the first product provides the first document as a form document, and the second product provides the second document as an intermediate document. In some embodiments, the first product provides the first document with processing order instructions for the second product. In certain embodiments, the second product provides the second document in a markup language.

BRIEF DESCRIPTION OF THE DRAWINGS

FIG. 8 illustrates a simplified screen diagram of the property view;

FIG. 10 illustrates a simplified screen diagram of a final document obtain through customer interaction;

FIG. 11 illustrates a simplified diagram of a response document; and

DETAILED DESCRIPTION OF EXEMPLARY EMBODIMENTS

Figure 1:
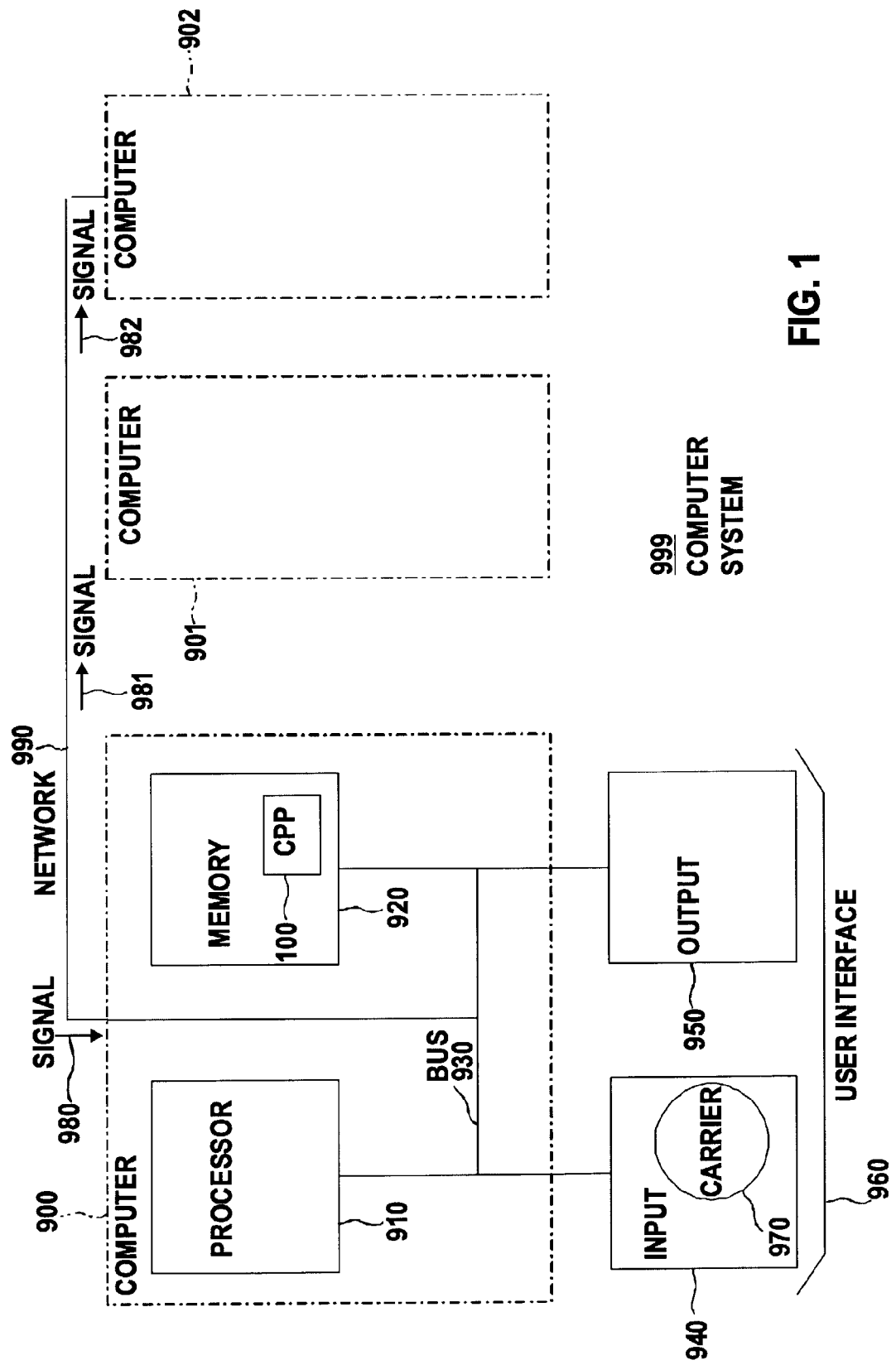
FIG. 1 illustrates a simplified block diagram of a computer network system having a plurality of computers.

FIG. 1 illustrates a simplified block diagram of the computer network system 999 having a plurality of computers 900, 901, 902 (or 90q, with q=0 . . . Q-1, Q any number).

Computers 900–902 are coupled via inter-computer network 990. Computer 900 comprises processor 910, memory 920, bus 930, and, optionally, input device 940 and output device 950 (I/O devices, user interface 960). As illustrated, the invention is present by computer program product (CPP) 100, program carrier 970 and program signal 980, collectively the "program".

In respect to computer 900, computer 901/902 is sometimes referred to as a "remote computer", computer 901/902 is, for example, a server, a router, a peer device or other common network node, and typically comprises many or all of the elements described relative to computer 900. Hence, elements 100 and 910–980 in computer 900 collectively illustrate also corresponding elements 10q and 91q–98q (shown for q=0) in computers 90q.

Computer 900 is, for example, a conventional personal computer (PC), a desktop and hand-held device, a multi-processor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory functions can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in system network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner, or disk drive. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900–902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

For explaining the present invention it is useful to introduce the following naming conventions. "Organization" and "customer" are convenient to distinguish two business partners. Both partners are usually in a predefined relationship such as vendor-buyer.

Data is distinguished into
layout data (X),
customer specific data (Y), and
customer input data (Z).

Layout data (X) determines the visual appearance of a document. Customer specific data (Y) is provided by a business application to be presented to a customer. Customer input data (Z) is provided by the customer to be processed by the application.

Electronic Documents are distinguished by the kind of data that is substantially present:
"form document" with layout data (X);
"intermediate document" with layout data (X) and customer specific data (Y);
"final document" with layout data (X), customer specific data (Y) and customer input data (Z);
"response document" with customer input data (Z).

"XML extensible markup language" stands for any other markup language with customizable tags; "HTML" stands for any markup language for a browser (e.g., HTML, WML).

Figure 2:
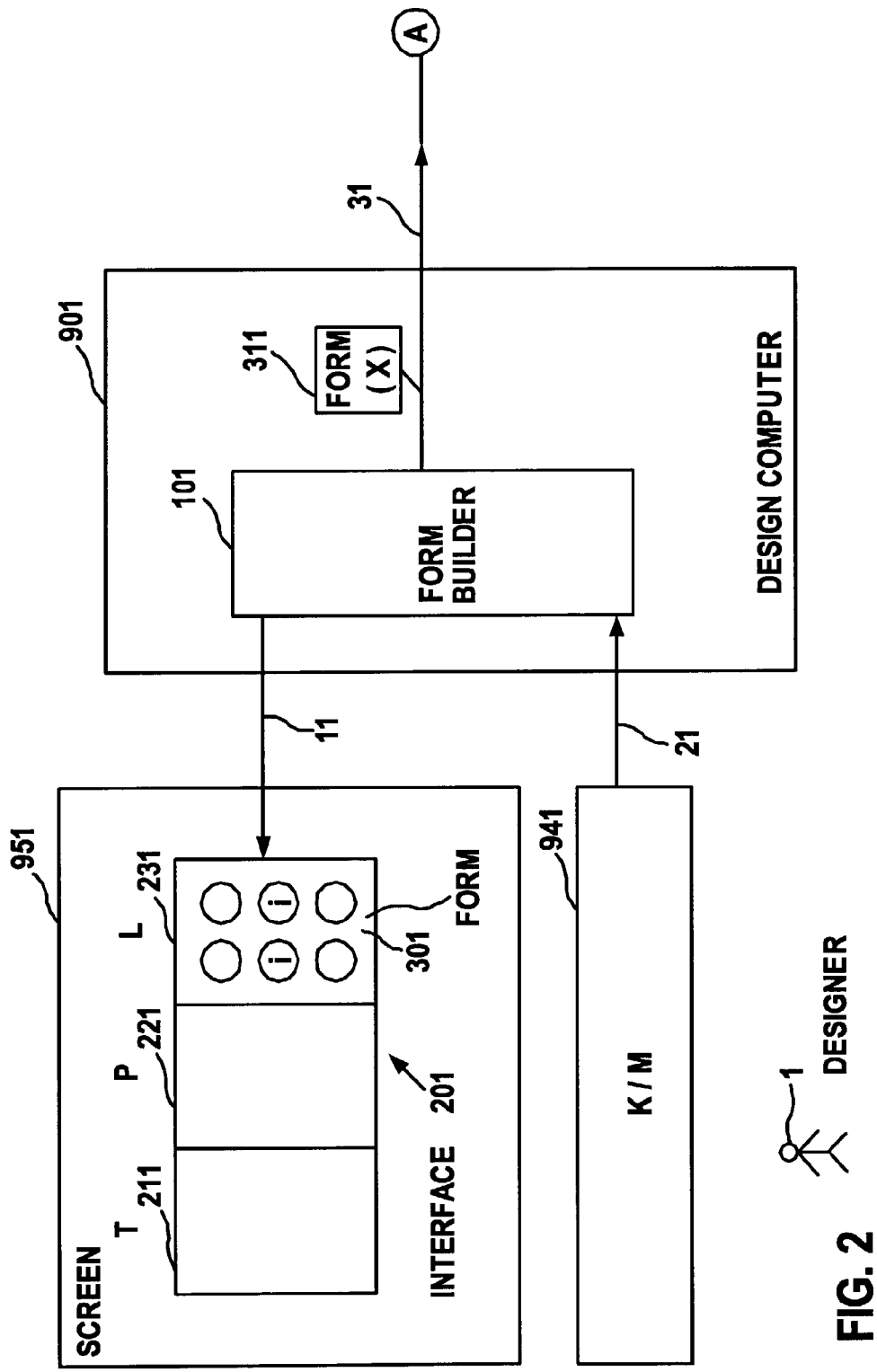
FIGS. 2–4 in combination illustrate a simplified block diagram of the computer network system of FIG. 1 that implements the present invention.
Figure 3:
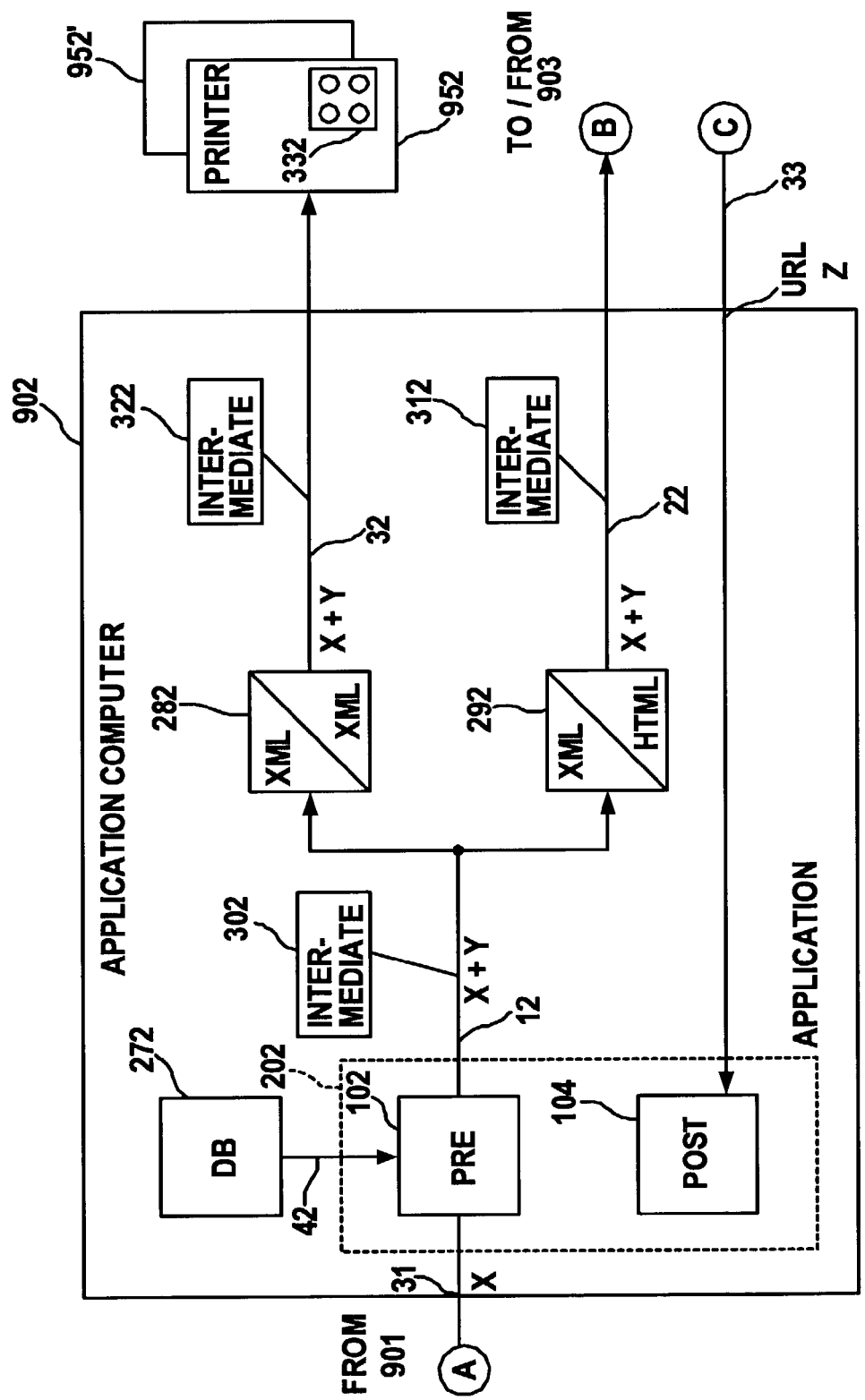
Figure 4:
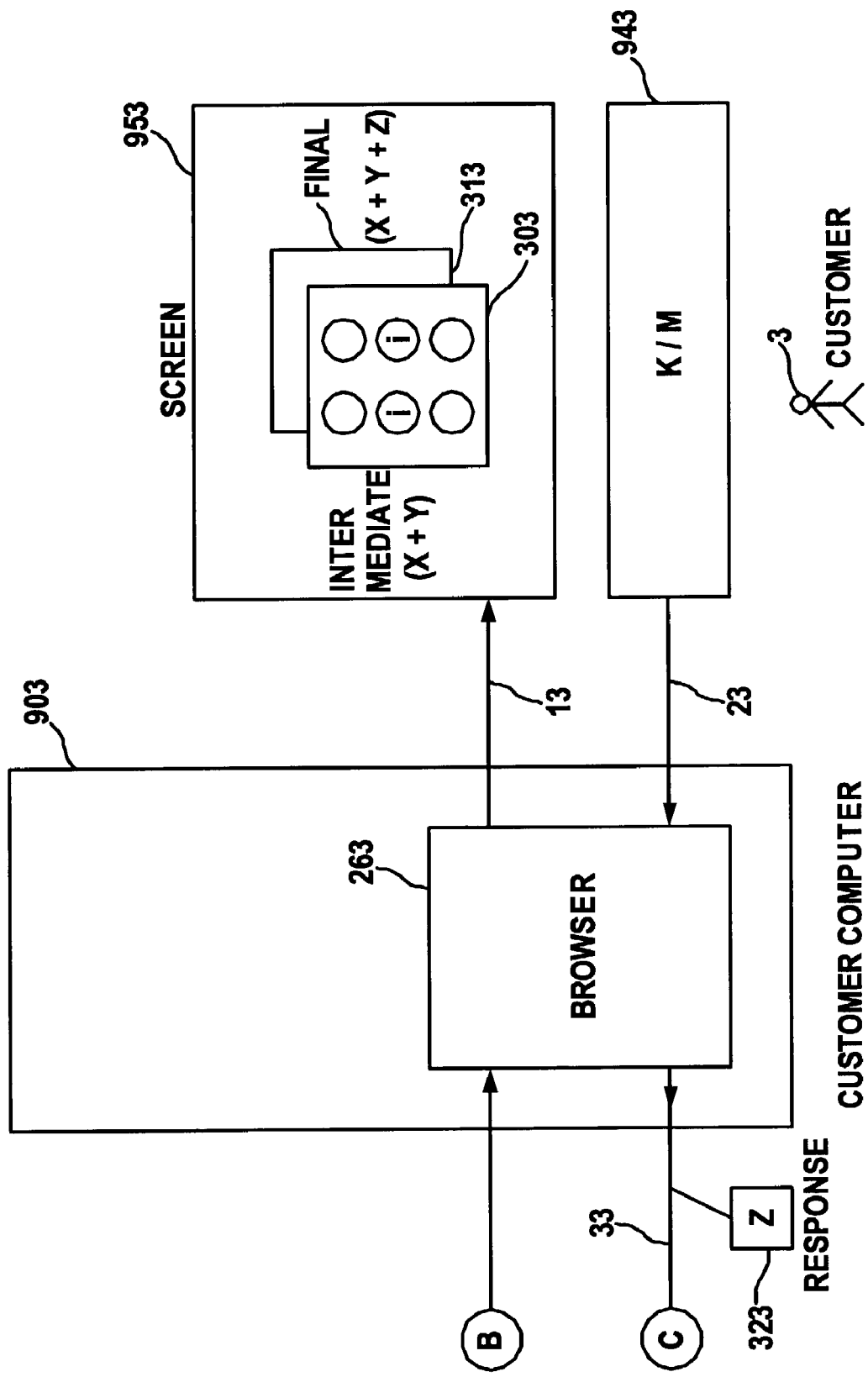

The term "interaction" stands for accepting input data (Z) from the customer; the term "interactive" stands for the possibility of accepting input data (Z) from the customer. According to the present invention, interactive elements are already defined in layout data (X). FIGS. 2–4 indicate interactive elements by a circle symbol with lowercase "i"; and indicate non-interactive elements by a plain circle symbol. FIGS. 7–10 indicates such elements by their visual appearance.

The term "make a document available" means the possibility to hand over any document from a sender computer to a recipient computer. Various options are well known in the art. For example, and without the intention to be limiting,
the sender pushes the document to the recipient,
the recipient pulls the document form the sender, or
the sender pushes the document to an intermediate computer for pulling by the recipient, or
the sender computer initially sends a link to the recipient computer, the recipient computer retrieves the document from the link later.

For convenience of explanation, where applicable, reference numbers have harmonized right-digits 1, 2 or 3.

FIGS. 2–4 in combination illustrate a simplified block diagram of the computer network system 999 that implements the present invention. System 999 comprises the following hardware:
design computer 901 (FIG. 2),
application computer 902 ("server computer", FIG. 3), and
customer computer 903 ("client computer", FIG. 4). Computers 901–902 may be, for example, in the possession of an organization (i.e. governmental institution or business enterprise). Computers 901–903 are coupled to well-known input/output devices such as screen 951 and keyboard/mouse 941 ("K/M") at computer 901 (FIG. 2), printer 952 and device 952' at computer 902 (FIG. 3), as well as screen 953 and keyboard/mouse 943 at computer 903 (FIG. 4). For simplicity, some hardware components of computers 901–903 such as memory 92$q$, bus 93$q$, processor 91$q$ and network 990 are not shown (q=1 . . . 3).

Computer system 999 communicates with at least 2 persons: designer 1 (FIG. 2) and customer 3 (FIG. 4). Computer 901 presents graphical interface 201 to designer 1 who designs the visual appearance of form document 301. Interface 201 has tree view 211 (T), property view 221 (P) and layout view 231 (L). Layout items are non-interactive layout elements and—according to the invention—also interactive layout elements. Details for interface 201 are given in connection with FIGS. 6–8.

Computer 903 with screen 953 presents intermediate document 303 to customer 3. Intermediate document 303 (X+Y data) is based on document 301 (X data) with substantially the same layout elements (X) as previously designed as a well as and with customer data (Y). Computer 903 invites customer 3 to input data into the interactive elements of document 303. When customer 3 indeed inputs data (Z), computer 903 converts intermediate document 303 into final document 313 (X+Y+Z data). Response document 323 (Z data) goes to computer 902 for further processing. Details of documents 303 and 313 are illustrated in connection with FIGS. 9–10.

Optional printer 952 (or device 952') prints intermediate document 332 (X+Y data) having non-interactive elements only. It is an advantage of the present invention that intermediate document 303 displayed on screen 953 is similar in appearance as document 332 on paper. Document 332 corresponds to the traditional document that is—optionally—mailed to customer 3. It is an advantage of the present invention that customer 3 has the choice between two look-similar documents:

paper document 332 that he/she traditionally receives by mail, and document 303 (on screen) that is enhanced by interactive elements.

It is an advantage that customer 3 might recognize the layout (fields at familiar positions).

To accomplish this, system 999 uses computer program products (CPP) according to the present invention. The CPPs are: form builder 101 (at computer 901), pre-processing module 102 and post-processing module 104 at computer 902 ("pre-module", "post-module"). Further computer programs are: application 202, database 272 ("DB"), XML-to-HTML converter 292, and optional XML-to-XML converter 282 at computer 902, as well as browser 263 at computer 903. The further programs are commercially available. For example, application is a business-server-page application; converter 292 is an XSLT-program (Extensible Style Language Transformation). In certain embodiments, modules 102 and 104 are part of application 202 (dashed frame). Each program comprises code to control a processor. In certain embodiments, the processor of the computers for the programs are illustrated.

Plain arrows between programs as well as to output devices and plain arrows from input devices indicate an exemplary logical data flow. Persons of skill in the art can provide the corresponding physical connections (cf. FIG. 1) without the need of further explanation herein. Small flags at the arrows indicate documents in coded form that may not appear visually:

form document 311,
intermediate document 302 (e.g., in XML-format),
intermediate document 312 (e.g., in HTML-format, "page"),
intermediate document 322 (e.g., in XML-format), and
response document 323 (e.g., in HTTP-response format with URL).

Figure 5:
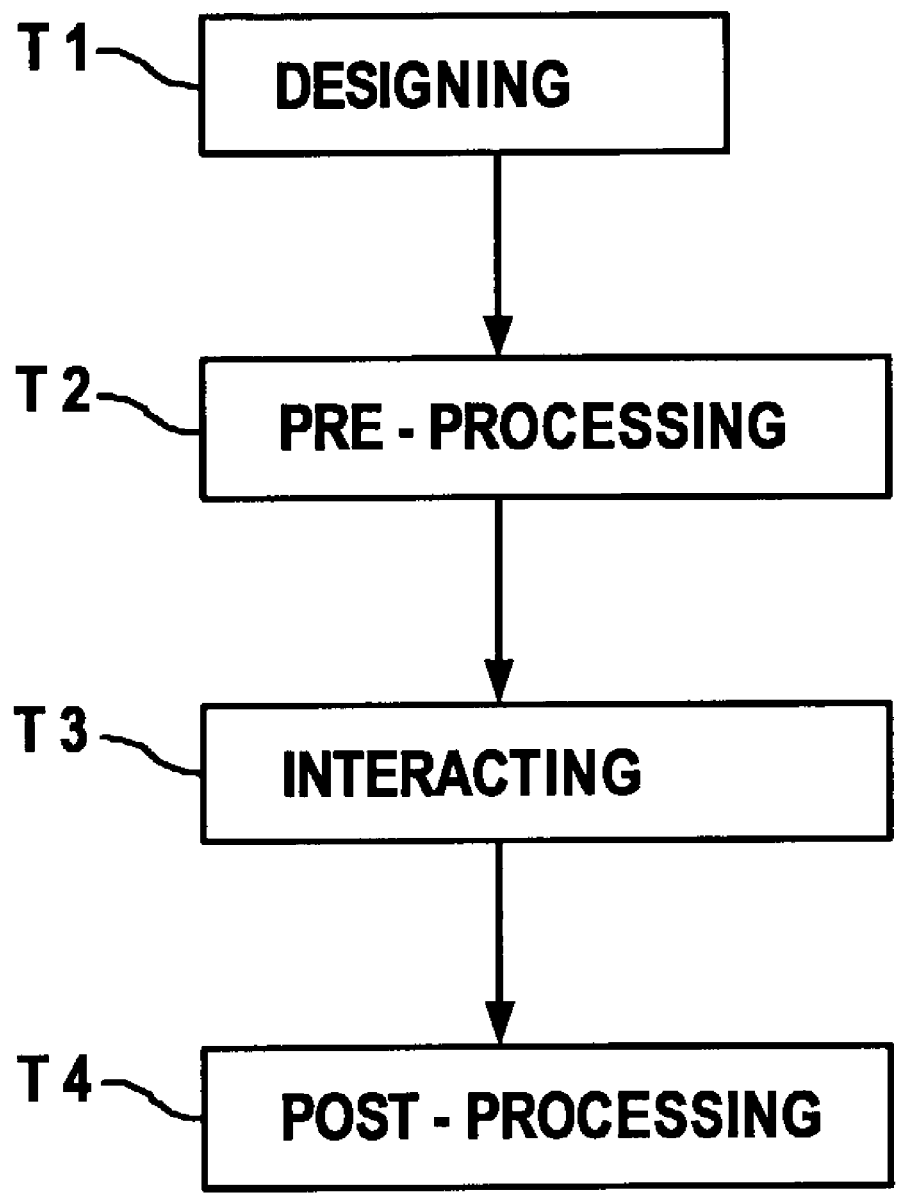
FIG. 5 illustrates a simplified flow chart diagram with major computer contributions at consecutive time periods.

FIG. 5 illustrates a simplified flow chart diagram with major computer contributions at consecutive time periods T1 to T4. For explaining details of the present invention, it is convenient to introduce:

designing time T1 ("first time"),
pre-processing time T2 ("second time", "run-time"),
interacting time T3 ("third time"), and
post-processing time T4 ("fourth time").

In certain embodiments, the contribution of computers 901–903 may correspond to these periods:

design computer 901 at T1,
application computer 902 at T2,
customer computer 903 at T3, and again
application computer 902 at T4. Details are now explained in returning back to FIGS. 2–4:

As in FIG. 2, at designing time T1, form builder 101 provides interface 201 with views 211/221/231 (cf. arrow 11). Designer 1 operates form builder 101 via keyboard/mouse 941 to define document 301 (cf. arrow 21). It is an advantage of the present invention that interactive elements are already defined at this early state. Form builder 101 codes visual appearance data (X) for document 301 into document 311 and makes document 311 available to computer 901 (arrow 31). In other words, form 311 is a document with predefined format that contains blank fields for filling with further data. Computer 901 is no longer required and can be disconnected. Likewise, designer 1 has done his or her job.

As in FIG. 3, at pre-processing time T2, pre-module 102 combines document 311 (X) with customer specific data (Y) from database 272 (cf. arrow 42) to provide intermediate document 302 (cf. arrow 12, X+Y), for example, in XML-format. In other words, document 302 is an XML-document in that pre-module 102 of application 201 has inserted Y-data.

Still at T2, or later, converter 282—optionally—converts intermediate document 302 from XML-format to a further XML-format for processing by any other computer or by device 952' or to a format suitable for printer 952 (cf. arrow 32). Mapping from first XML-format to second XML-format is convenient in business-to-business (B2B) transactions from application 201 to other business applications (or vice versa).

Still at T2, according to the present invention, XML-to-HTML converter 292 converts intermediate document 302 to intermediate document 312 in HTML-format and makes document 312 (HTML-page) available to computer 903 (cf. arrow 22). Here (or optionally already in pre-module 102), the URL of post-module 104 is added to document 312.

As in FIG. 4, at interacting time T3, browser 263 interprets intermediate document 312 (HTML-page) to display intermediate document 303 on screen 953 (arrow 13), thereby presenting non-interactive and interactive elements to customer 3. It is an advantage of the present invention that the visual arrangement for layout elements in document 303 is similar to the presentation in document 301 to designer 1 (cf. interface 201, view 231).

Still at T3, customer 3 is now invited to input data for processing by application (Z data) through keyboard/mouse 942 and the interactive elements (cf. arrow 23). As mentioned, Z-data is information provided by customer 3, and may be assigned to values of the interactive elements. By interacting, intermediate document 303 is converted into final document 313 (X+Y+Z). Browser 263 now makes response document 323 (Z-data) available to post-module 104 (computer 902, arrow 33) at the predefined URL (X und Y already known to application 202).

At post-processing time T4, post-module 104 uses document 323 for further processing.

Figure 6:
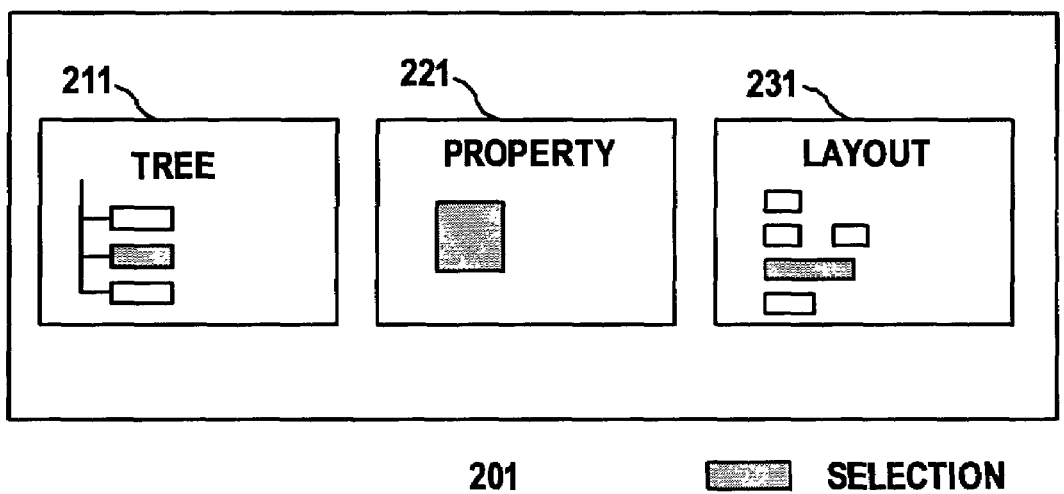
FIG. 6 illustrates a simplified screen diagram of a graphical interface with a tree view, a property view, and a layout view.

FIG. 6 illustrates a simplified screen diagram of graphical interface 201 with tree view 211 ("TREE"), property view 221 ("PROPERTY"), and—optionally—layout view 231 ("LAYOUT") according to the present invention. Selecting and highlighting is illustrated by hatching. It is known in the art that developer 1 can select an object on a screen, for example, by double-clicking with the mouse, by pressing predefined keys, or otherwise. Usually, the object that is selected is also highlighted.

Conveniently, graphical user interface 201 has tree view 210 on the left side, property view 220 in the center, and layout view 230 on the right side.

Tree view 211 (details in FIG. 7) is a logic view with nodes to display general attributes and output elements for document 301 (and thereby also of documents 332, 303). Tree view 211 visualizes layout structure data (X) of document 301 and the processing order for pre-module 102. Designer 1 navigates in tree 211 and takes advantages of common tree operations, such as expand and collapse, drag and drop.

Property view 221 (details in FIG. 8) allows designer 1 to maintain the attributes of the selected tree node. Designer 1 can determine the behavior of the interactive elements.

Layout view 231 displays document 301 by visual appearance, similar as it will be presented as document 332 (print) or document 303 (on screen) to customer 3.

Without the intention to be limiting, the present invention is now explained by a particular example. An online bookstore (organization) uses an interactive offer (document) to invite one of its Internet customers 3 to buy new books. For convenience of explanation, the example is simplified. Without the need of further explanation herein, persons of skill in the art can implement a real-life scenario, for example, by adding price information, encrypting credit card numbers, by providing a real customer address, including graphics for logos, etc. Also, persons of skill in the art can implement customer identification (ID).

Figure 7:
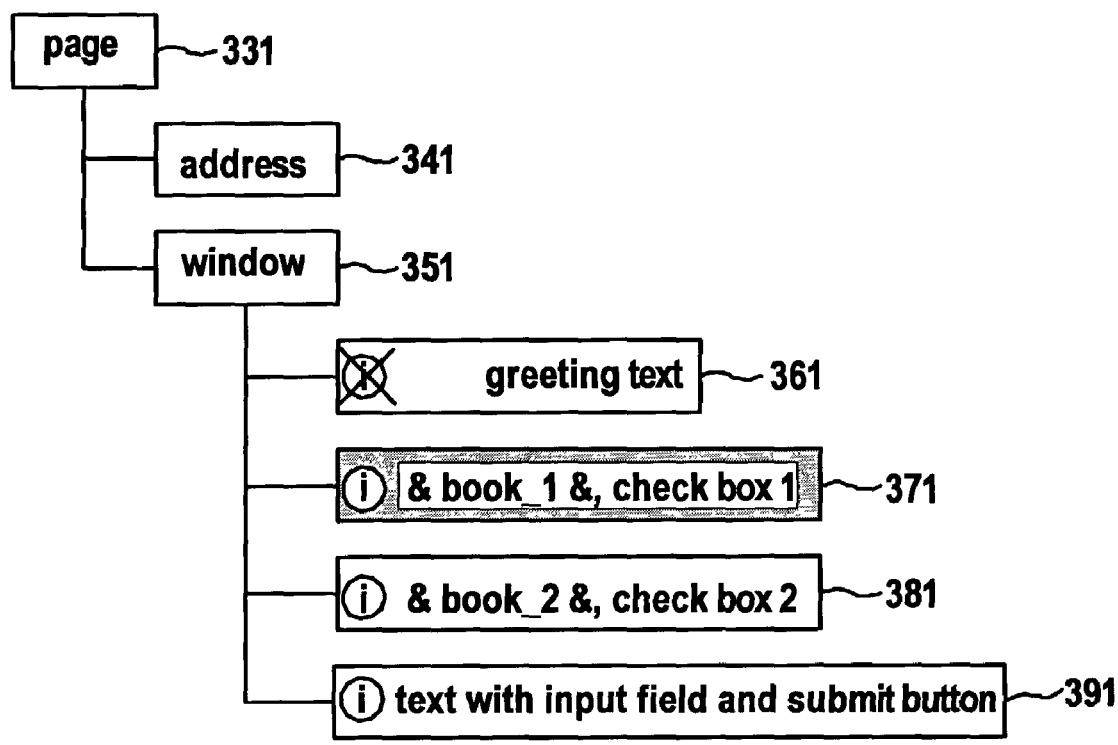
FIG. 7 illustrates a simplified screen diagram of the tree view.

FIG. 7 illustrates a simplified screen diagram of tree view 211. View 211 has a plurality of nodes. Labels are added to the node for convenience of explanation only; optionally, nodes are distinguished by graphical icon symbols. Page node 331 is higher in hierarchy than address node 341 and window node 351; window node 351 has field nodes 361, 371, 381 and 391. In the example, the field nodes allow representation of the interactive elements. There is no need that all field nodes represent interactive elements. Optionally, designer 1 can declare field elements interactive or non-interactive. For example, as illustrated by the circle-symbols, nodes 371–381 and 391 are selected as interactive; but node 361 is selected as non-interactive (crossed out symbol).

The nodes symbolize instructions for pre-module 104, such as, for example:

page node 331: to generate XML-code for a new page of the document (i.e. 322, 303);

address node 341: to include the customer address into the document;

window node 351: to place the elements of nodes 361–391 into a window of the document;

field node 361: to include a greeting text;

field nodes 371 and 382: to include text with variable content and to include a check box;

field node 391: to include text, an input field and a submit button.

As indicated by hatching, designer 1 has selected node 371.

FIG. 8 illustrates a simplified screen diagram of property view 221. View allows designer 1 to edit the properties ("attributes") of node that is selected in tree view 211. In other words, designer determines layout data (X). Optionally, view 221 has a tab strip to organize the attributes. In the example, choosing "GENERAL ATTRIBUTES" opens a text editor for editing field attributes.

For the checked node 371 (cf. FIG. 7), designer 1 has typed "&book_title_1&, check box 1". The &-symbol-tagged text is a variable; "check box" is an instruction to include a check box; and "1" is an identifier for the check box. The interactive element is "check box 1". Designer 1 can edit all attributes. For example, designer 1 could replace the check box to a radio button.

As in the example, designer 1 can also choose the tab strip "WEB PROPERTIES" to declare fields as interactive or to declare details of the interactive fields, like type, length by numbers of characters, etc.

Finally, when designer 1 has completed reviewing all nodes (cf. tree view 211), form builder 101 creates form document 311 (X data).

At T2, pre-module 102 combines document 311 (X) with customer specific data (Y) from database 272 to document 302 as follows, for example, in the order given by the nodes:

starting a new page (cf. node 331), writing the address "T.S." (cf. node 341), starting a window (cf. node 351), writing the greeting "T. please see new books by M.T.", replacing "&book_1&" by "ALPHA", adding code for a check box (i.e. interactive) and a box ID (cf. node 371);

replacing &book_2& by "BETA", adding code for a check box (i.e. interactive) and a box ID (cf. node 381);

writing text "Credit Card" and adding code for a input field (i.e. interactive), writing "submit", and adding code for a submit button (i.e. interactive).

As mentioned above, intermediate document 302 (X+Y) now goes through converter 292; intermediate document 312 (HTMl, X+Y, URL) is made available to customer computer 903.

Figure 9:
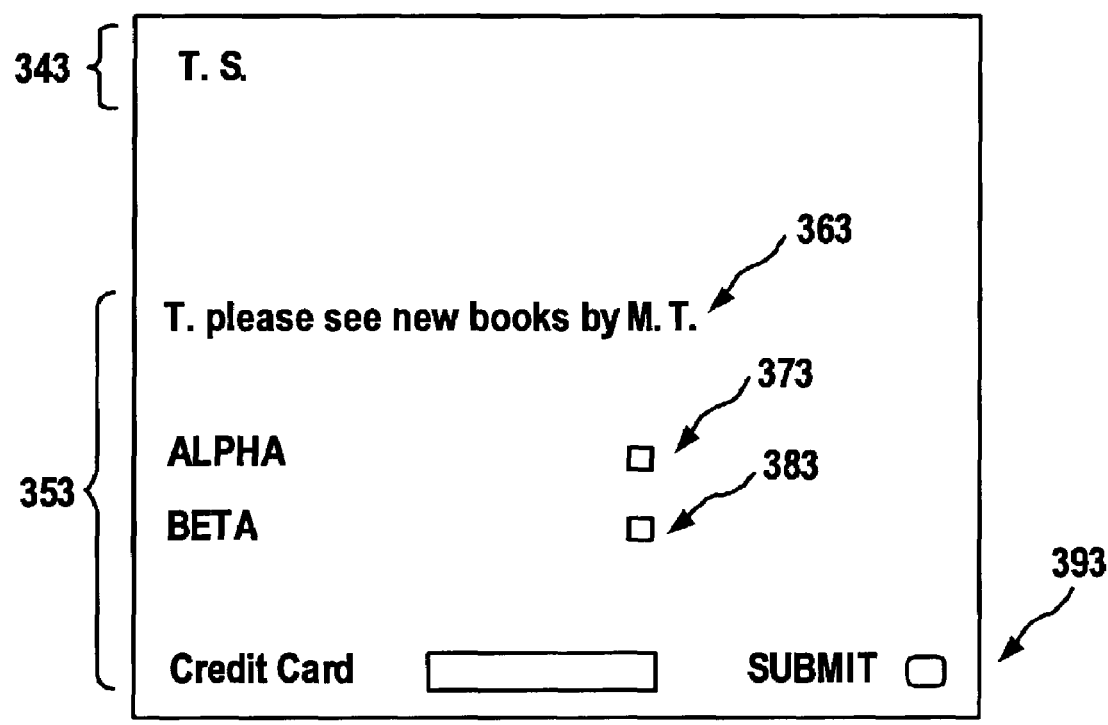
FIG. 9 illustrates a simplified screen diagram of an intermediate document as presented to a customer.

FIG. 9 illustrates a simplified screen diagram of intermediate document 303 as presented to customer 3 on screen 953 (at T3). Reference numbers 343, 353, 363, 373, 383, 393 for layout elements in FIG. 9 corresponds to reference numbers 341, 351, 361, 371, 381, 391, respectively, for nodes in FIG. 7. In other words, there is a mapping between nodes and layout elements. Interactive elements are: the checkboxes right to the book titles, the input field for the credit card number, and the submit button.

FIG. 10 illustrates a simplified screen diagram of final document 313 obtained through customer interaction. In difference to document 303 (FIG. 9), customer has checked the box for ALPHA, has typed in a credit card number and has pressed the submit button. In other words, customer input data (Z) was added. Values of interactive elements change: the value of the first checkbox element changes from "unchecked" to "checked"; the value of the second checkbox "unchecked" remains; the value of the input field is modified to the credit card number; and the value of the submit button goes to "SUBMITTED".

FIG. 11 illustrates a simplified diagram of response document 323. Response document 323 comprises the URL as well as the following customer input data (Z): BOX 1 CHECKED, 1234-5678-1234-5678, SUBMIT. The way document 323 is coded is not important for the present invention; conveniently is adding Z-Data as parameter to URL address in a HTTP-response from customer computer 903 to server computer 902. "SUBMIT" is the Boolean value of the submit button.

The present invention may now be summarized for each time period as follows:

At designing time T1, a designer (1) at the book-store designs a new form (301/311) for the offer (document 303) and form builder 101 provides document 311 with layout data (X) such as location of address and fields (non-interactive), location of check boxes, input field and submit button (interactive), as well as placeholders for including Y-data (non-interactive, e.g., "&book_title_1&"), etc.

A customer relationship management (CRM) program (i.e., application 202) identifies customer specific data (Y), such as:

name and address of the customer "T.S.", content of text fields, such as "T., please see new books by M.T.", and two books titled "ALPHA" and "BETA" of likely interest to customer 3.

At pre-processing time T2, pre-module 102 combines layout data (X) in document 311 with customer specific data (Y) to provide intermediate document 302 (X+Y, XML). Among other actions, for example, pre-module 102 replaces "&book_title_1&" by "ALPHA". Optionally, converter 282 converts intermediate document 302 to intermediate document 322 (X+Y, XML) by ignoring interactive elements. In other words, printer 952 does not print checkboxes, input fields and submit button (document 332). Converter 292 converts intermediate document 302 (X+Y, XML, without substantially modifying its content) to intermediate document 312 (X+Y, HTML). Document 312 has a plurality of HTML-portions to define:

customer address and text, check boxes, input field and submit button (interactive), and URL of post-module 104.

HTML is well known in the art; representations for the interactive elements are, for example, tagged text elements such as "<input type=text name= . . . >" for the credit card number.

At interacting time T3, customer 3 operates computer 903 that is a stationary or portable personal computer (PC) or a mobile computing device (e.g., mobile phone). Browser 263 is a Microsoft Explorer, or Netscape Navigator. Customer 3 reads the offer (i.e. document 303) by browser 263, checks ALPHA, and types in credit card information. When customer 3 operates the submit button, browser 263 makes response document 323 available to post-module 104. Document 323 comprises:

URL (required to find post-module 104), an indication that box 1 was selected (partial acceptance of offer), credit card number ("1234-5678-1234-5678"), customer identification (not shown).

In other words, offer from the book-store to customer 3 resulted in a purchase request by customer 3. Optionally, when implemented by further input field, customer 3 can add addition information into document 323.

At post-processing time T4, book-store receives the request (document 323) and causes shipment of book "ALPHA" to customer 3.

Figure 12:
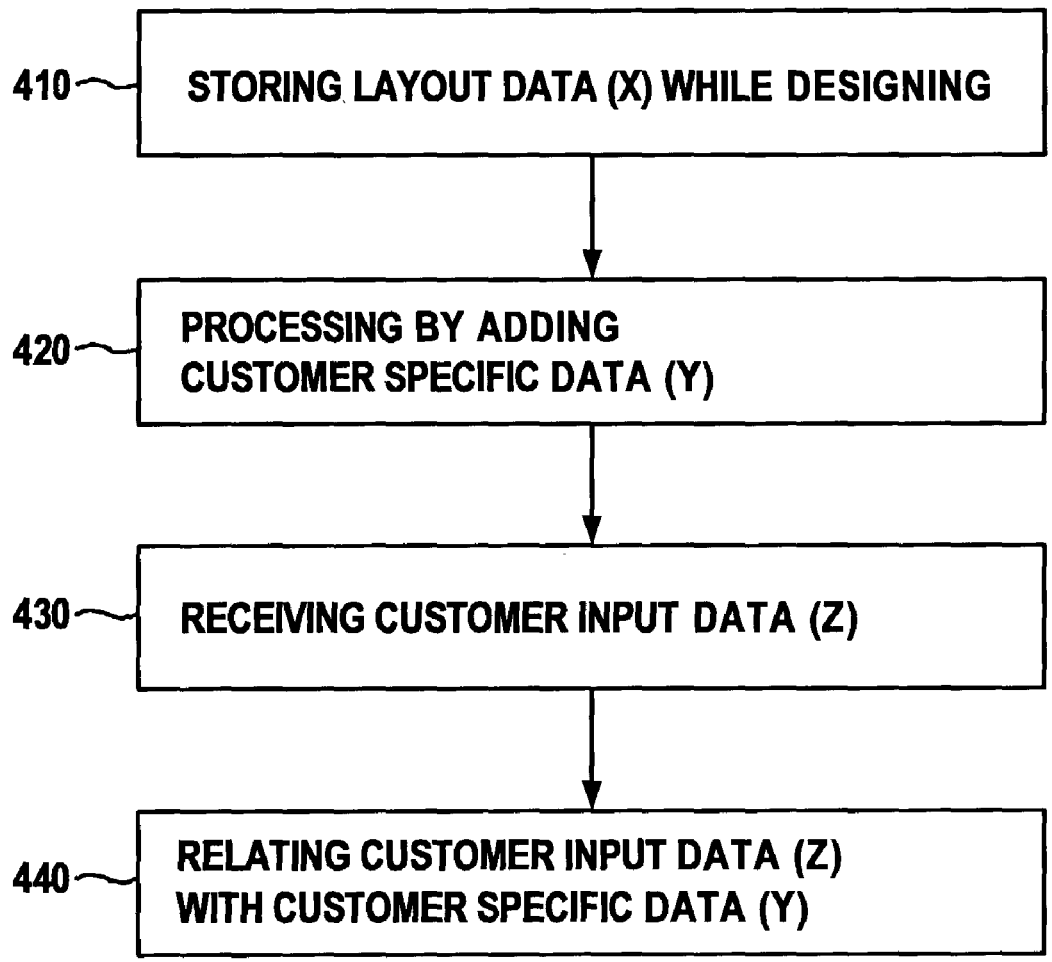
FIG. 12 illustrates a simplified flow chart diagram of a method according to the present invention.

FIG. 12 illustrates a simplified flow chart diagram of method 400 according to the present invention. Method 400 for retrieving information through interactive elements on a browser for subsequent processing by a business application comprises:

storing 410 layout data (X) with interactive elements 371, 381, 391 in first document 311 while designing visual document appearance 301; processing 420 first document 311 by adding customer specific data (Y) from business application 202, thereby providing second document 302/312 in markup language, the second document having representations for the interactive elements; receiving 430 customer input data (Z) from customer 3 in third document 323 from browser 263, wherein browser 263 has presented visual document appearance 303 of second document 302/312 to customer 3 and has prompted customer 3 through interactive elements 373, 383, 393 to return customer input data (Z); and relating customer 440 input data (Z) with customer specific data (Y) in business application 202.

A method for prompting customer 3 to input customer input data (Z), comprises the following: Form builder 101 at design computer 901 designs form document 301, 311 with layout data (X) (form document 301, 311 having representations of interactive elements 371, 381, 381 to be shown to customer 3). Pre-processing module 102 at application computer 902 processes form document 301, 311 to provide intermediate document 302, 312 (thereby combining layout data (X) with customer specific data (Y) and converting the representations of interactive elements into markup code for interactive elements). Browser 263 at customer computer 903 interprets the markup code to present intermediate document 303 to customer 3 and prompts customer 3 to input customer input data (Z) into the interactive elements (thereby providing final document 313 with layout data (X), customer specific data (Y) and customer input data (Z)). Browser (263) at the customer computer (903) provides response document 323 with customer input data (Z). Post-processing module 104 at application computer 902 processes customer input data (Z) in combination with customer specific data (Y).

Although the present invention has been explained in connection with a single customer 3 and a single customer computer 903, the invention is especially useful for a large number of customers.

Further examples for document are: order confirmations, invoices, account statements, checks, salary statements, delivery notes, customs forms, industry-specific forms, such as quality forms in automobile manufacturing.

Modifications and further embodiments of the present inventions are disclosed in the following:

Optionally, application 201 selects XML-to-XML conversion rules for converter 291 from a plurality of predefined rule sets.

Optionally, converter 291 also provides output in further formats such as portable document format (PDF).

Some fields can be implemented as conditional fields.

For example, some elements that are undesired for printing (document 332) but that are desired for displaying on screen 953, are excluded from documents 322/332.

Syntax checks for field names and attributes can be provided in form builder 101. For example, form builder 101 verifies that designer 1 specifies only valid field names as interactive elements.

The advantages of the present invention can be summarized as a bi-directional communication link between application computer 901 and customer computer 902 with communication trough interactive elements that are defined at a previous designing time. Form designing (T1) and data retrieval from database (T2) are separated. Designer 3 uses a single tool—form builder 101—to create different documents, the document for the printer and the document for screen interaction. Programming skills of designer 1 are not required.

The present invention can be summarized as interactive computer system 901, 902, 903 that enters customer input data (Z) into business application 202. First computer 901 designs visual document appearance 301, and thereby provides layout data (X) with interactive elements 371, 381, 391 in first document 311. Second computer 902 processes first document 311 by adding customer specific data (Y) from business application 202, provides thereby second document 302, codes second document 302, 312 into markup language having representations for the interactive elements, and further relates customer input data (Z) with customer specific data (Y) in business application 202. Third computer 903 with browser 263 displays visual representation 303 of second document 302, 312 to customer 3 (as designed by first computer 901), prompts customer 3 for input data (Z) through interactive elements 373, 383, 393 and forwards input data (Z) to second computer 902 through third document 323.

In certain embodiments, first computer 901 has graphical interface 201 to assist designer 1 by tree view 211 to the document structure and by property view 221 to the properties of layout items.

Also, a method for prompting customer 3 to input customer input data Z can be summarized by the following steps: by form builder 101 at design computer 901, designing form document 301, 311 with layout data (X), the form document 301, 311 having representations of interactive elements 371, 381, 381 to be shown to customer 3; by pre-processing module 102 at application computer 902, pre-processing form document 301, 311 to provide intermediate document 302, 312, thereby combining layout data (X) with customer specific data (Y) and converting the representations of interactive elements into markup code for interactive elements; by browser 263 at customer computer 3, interpreting the markup code to present intermediate document 303 to customer 3 and to prompt customer 3 to input customer input data (Z) into the interactive elements, thereby providing final document 313 with layout data (X), customer specific data (Y) and customer input data (Z); by browser 263 at customer computer 903, providing response document 323 with customer input data (Z); and by post-processing module 104 at application computer 902, post-processing customer input data (Z) in combination with customer specific data (Y).

A combination of computer-program products 101, 102, 104 to process customer input data (Z) obtained through browser-customer interaction by interactive elements comprises: first product 101 for designing first document 301, 311 with layout data (X) that partially represents the interactive elements; second product 102 to provide second document 302, 312 by adding customer specific data (Y) to first document 301, 311 and by coding the interactive elements such that browser 263 interpreting second document 302, 312 is able to write customer input data (Z) into third document 323; and third product 104 to process third document 323 in combination with customer specific data (Y).

In certain embodiments, first product 101 is a form builder, second product 102 is a pre-processing module, and third product 104 is a post-processing module; first product 102 provides the first document as a form document, and second product 102 provides the second document as an intermediate document; first product 101 provides the first document with processing order instructions for the second product 102; second product 102 provides the second document in a markup language.

We claim:

1. A method for prompting a customer to input customer input data, the method comprising:
   by a form builder module at a design computer, providing electronic form data comprising layout data and representations of interactive elements;
   by a pre-processing module at an application computer:
      combining the electronic form data with customer specific data from a database to generate a first intermediate form document;
      generating a second intermediate form document based on the first intermediate form document, the second intermediate form document in a data format capable of being output to a printer as a blank form without further modification, and the second intermediate form document ignoring intermediate elements; and
      generating a third document, the third document in a data format for display to a customer by a browser;
   by a customer computer, interpreting the third document to display the third document to the customer in a visual format that looks the same as the blank form; and
   by the customer computer, receiving customer input data from the customer via the third document; and transmitting the customer input data to the application computer for association with the customer specific data.

2. An interactive computer system that provides customer input data to a business application, the system comprising:
   a first computer configured to provide electronic form data comprising layout data and representations of interactive elements;
   a second computer configured to:
      combine the electronic form data with customer-specific data from a database to generate a first intermediate form document;
      generate a second intermediate form document based on the first intermediate form document, the second intermediate form document in a data format capable of being output to a printer as a blank form without further modification, and the second intermediate form document ignoring interactive elements; and
      generating a third document based on the first intermediate form document, the third document in a data format for display to a customer by a browser, wherein the third document displayed to the customer looks the same as the blank form; and
   a third computer configured to display the third document to a customer in a visual format that looks the same as the blank form, receive customer input data from the customer via the third document; and transmit the customer input data to the second computer for association with the customer specific data in the business application.

3. The system of claim 2, wherein the first computer has a graphical interface capable of simultaneously displaying both a tree view and a property view of the layout data.

4. A computer-implemented method for processing data used by a business application, the method comprising:
   receiving electronic form data comprising layout data and representations of interactive elements;
   combining the electronic form data with customer-specific data from a database to generate a first intermediate form document;
   generating a second intermediate form document based on the first intermediate form document the second intermediate form document in a data format capable of being output to a printer as a blank form without further modification, and the second intermediate form document ignoring interactive elements;
   generating a third document based on the first intermediate form document, the third document in a data format for display to a customer by a browser, and wherein the third document displayed to the customer looks the same as the blank form;
   receiving customer input data received from a customer via the third document; and
   associating the customer input data with the customer specific data in the business application.

5. The method of claim 4, wherein generating the third document comprises generating markup code for the representations of interactive elements.

6. The method of claim 4, wherein:
   the electronic form data comprising layout data and representations of interactive elements is generated on a first computer;
   combining the electronic form data with customer specific data from a database to generate a first intermediate form document is performed on a second computer;
   customer input data is received on a third computer that communicates with the second computer via the Internet; and
   associating the customer input data with the customer specific data in the business application is performed on the second computer.

* * * * *